Nov. 30, 1965  R. L. TWEEDALE  3,220,751
QUICK HITCH WITH TOGGLE ACTION
Filed May 21, 1962  4 Sheets-Sheet 1

INVENTOR.
RALPH L. TWEEDALE
BY
Wolfe, Hubbard, Voit & Osann
ATTORNEYS.

Nov. 30, 1965  R. L. TWEEDALE  3,220,751
QUICK HITCH WITH TOGGLE ACTION
Filed May 21, 1962  4 Sheets-Sheet 2

INVENTOR.
RALPH L. TWEEDALE
BY
Wolfe, Hubbard, Voit & Osann
ATTORNEYS.

Nov. 30, 1965   R. L. TWEEDALE   3,220,751
QUICK HITCH WITH TOGGLE ACTION
Filed May 21, 1962   4 Sheets-Sheet 3

INVENTOR.
RALPH L. TWEEDALE
BY
Wolfe, Hubbard, Voit & Osann
ATTORNEYS.

Nov. 30, 1965  R. L. TWEEDALE  3,220,751
QUICK HITCH WITH TOGGLE ACTION
Filed May 21, 1962  4 Sheets-Sheet 4
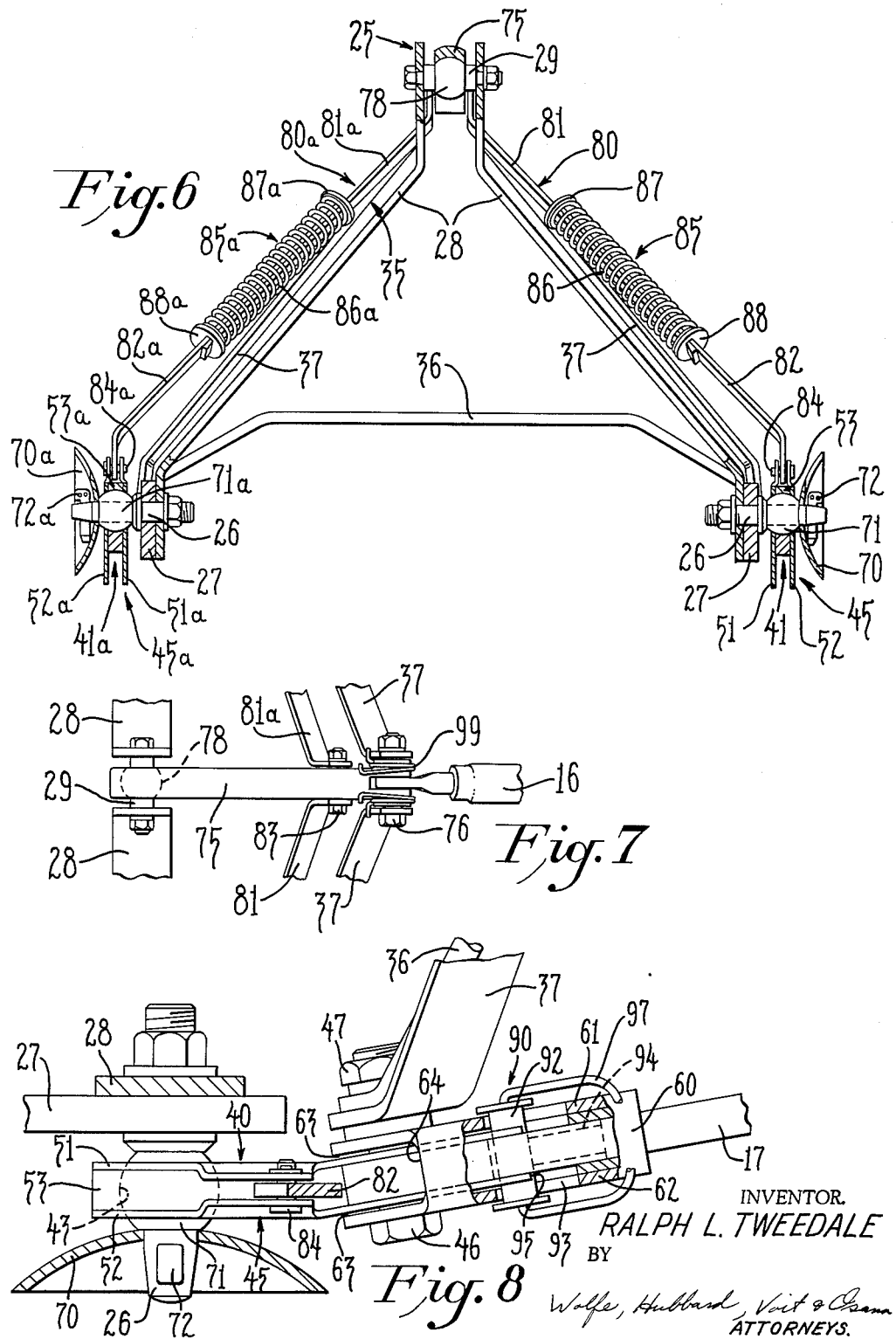
INVENTOR.
RALPH L. TWEEDALE
BY
Wolfe, Hubbard, Voit & Osann
ATTORNEYS.

United States Patent Office 3,220,751
Patented Nov. 30, 1965

3,220,751
QUICK HITCH WITH TOGGLE ACTION
Ralph L. Tweedale, Southfield, Mich., assignor to Massey-Ferguson Inc., Detroit, Mich., a corporation of Maryland
Filed May 21, 1962, Ser. No. 196,301
4 Claims. (Cl. 280—461)

The present invention relates to tractor-implement hitching mechanism, and more particularly to a quick-hitching mechanism for use with the well known Ferguson type tractor employing a three-point hitch linkage.

Various attempts have been made in the past to develop mechanisms for permitting quick hitching of an implement to a tractor having a three-point hitch. However, none of these attempts has been completely successful due to the expensive modifications which were required to be made or because of the inherent limitations which these mechanisms impose on the three-point hitch arrangement. For example, some of these prior devices require the addition of a heavy A-frame to the mast already existing on the implement; others tend to rigidize the hitch linkage or alter important geometric relationships on which the success of the three-point linkage depends. Moreover, many of the prior devices cannot be operated from the tractor seat, nor can they be used with certain implements in which the connecting pins are obstructed.

It is the primary aim of the present invention to provide an improved quick-hitching mechanism for use with a standard type of three-point hitch linkage wherein the tractor operator can couple or uncouple the implement without dismounting or moving from the tractor seat and which may be used with all of the implements regularly connected to the tractor.

It is another object to provide a quick-hitching mechanism which does not alter the geometry of the three-point tractor-implement hitch linkage and which does not affect the intended mode of operation or efficiency of the implement. Moreover, it is an object to provide such a hitch mechanism which requires only minor changes to the standard hitch linkage and the adding of a minor attachment to the individual implements.

It is a general object to provide a quick-hitching mechanism which is simple and easy to operate and which permits the tractor operator to couple up by backing the tractor into engagement with the implement and raising the power elevating draft links.

Upon completion of the work, by simply releasing a latch and reversing the procedure the operator may drive the tractor away from the uncoupled implement. In this connection it is an object to provide a hitch linkage which tolerates minor variation in the spacing of the hitch points in the implement and which does not require any special jockeying of tractor or hydraulic lift or any special positioning of the implement to secure a fit.

It is a further object of the present invention to provide a quick-hitching mechanism which is safe, secure, and inherently strong, capable of use with even the heaviest types of implements. It is nevertheless an object to provide a quick-hitch mechanism which is light in weight, inherently inexpensive and easy to install so that a farmer may equip his tractor and all of his implements with the new device at low cost.

Other objects and advantages of the invention will become apparent upon reading the following detailed description and upon reference to the drawings in which:

FIG. 6 is a section looking forwardly along the line 6—6 of FIG. 5;

FIG. 7 is an enlarged fragmentary top view of the upper link along the line 7—7 in FIG. 5; and FIG. 8 is an enlarged top view of a lower link connection taken along the line 8—8 of FIG. 4, with portions broken away.

While the invention has been described in connection with the preferred embodiment, it will be understood that I do not intend to be limited to the particular construction shown but intend to cover the various altenative and equivalent arrangements falling within the spirit and scope of the appended claims.

Figure 1:
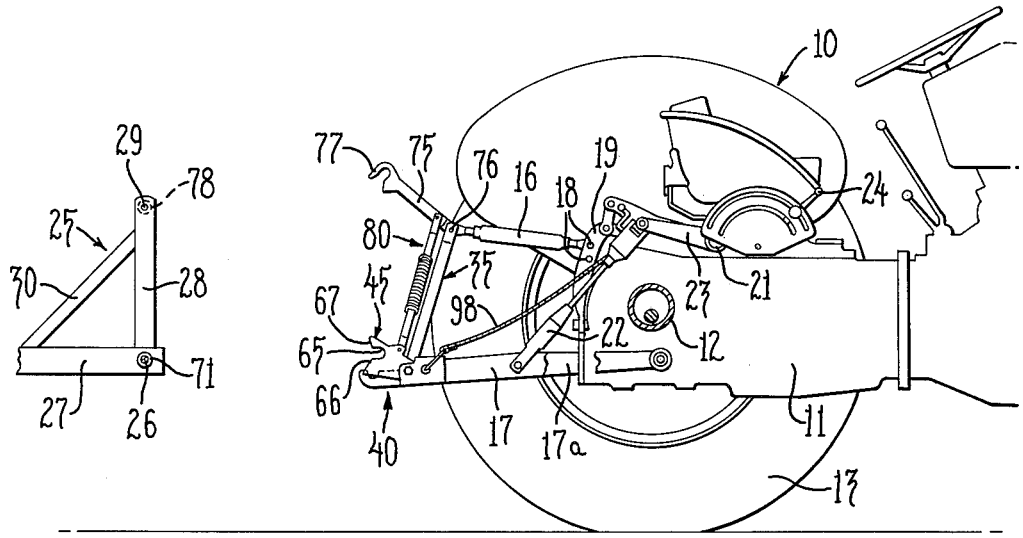
FIGURE 1 is a partial side elevation of a tractor and an implement, with one driving wheel removed from the tractor to disclose the hitching mechanism of the present invention.

Turning now the the drawings, there is shown in FIG. 1, the rear portion of a tractor 10 having a rear housing 11, an axle 12 and rear traction wheels 13 (only one of which is shown). The particular tractor shown is the well known Ferguson-type tractor and employs the familiar three-point hitch linkage. It will be understood that this linkage includes a pair of lower or draft links 17 arranged in trailing relation to the tractor and an upper or compression link 16.

The upper link 16 which may be of the typical turnbuckle construction, is pivotally connected by a pin to any one of a plurality of vertically spaced openings 18 in a bracket 19 secured to the rear central portion of the tractor housing 11. The draft links 17 are pivoted for universal swinging movement to opposite sides of the lower portion of the rear housing 11. The draft links are adapted to be raised and lowered by power operated means such as an hydraulic ram enclosed in the tractor body 11 and operated through a rock shaft 21 having lift arms 23 at opposite ends connected to the respective draft links 17 by drop links 22. The length of one of the drop links 22 may be adjusted by means of a leveling crank which permits relative manual adjustment of the height of the trailing ends of the draft links 17 with respect to the other. To actuate the lift arms 23 and thus raise or lower the draft links 17, a quadrant lever 24, within easy reach of the tractor operator, is coupled to a valve which controls the flow of hydraulic fluid admitted or exhausted from the hydraulic ram.

It will be further understood that an implement 25, only a portion of which is shown, which is adapted to be coupled to the three-point hitch linkage of the tractor, includes a pair of spaced-apart draft pins 26 secured to frame members 27. In the illustrative implement, a double mast 27 extends upwardly from the frame members 27 and mounts a mast pin 29 above and between the draft pins 26. The term "mast pin" will be understood to include any central elevated hitch pin on the implement. The mast 28 may be reinforced, as shown here, by means of angle braces 30 arranged triangularly from the frame members 27.

For the purpose of maintaining the links on the tractor spaced to correspond with the draft pins on the implement a spacing A-frame 35 is provided including a base member 36 and upwardly converging side members 37. The bolted connections at the ends of the members 36, 37 preferably provide a limited amount of play.

In accordance with the present invention, engaging or hook members are provided at the trailing ends of each of the draft links having cooperating keeper members pivoted thereon for fore-and-aft rocking movement between an upraised or pin-receiving position in which the keepers receive the draft pin on the implement and a lowered or locking position in which the keepers serve to transport the pins into seated position on the hook with toggle action as the draft links are power elevated. More specifically in accordance with the invention, a top engaging member or hook is provided which is pivoted to the top link and which is coupled mechanically to the keeper members for simultaneous engagement of the mast pin on the implement to complete the three-point connection. Moreover, means are provided for latching the engaging members in their closed positions and for releasing the latch without necessity for the tractor operator's leaving his seat.

Thus, turning to the exemplary construction shown in the drawings, hook assemblies 40, 40a are provided at the ends of the draft links 17, 17a respectively. In the discussion which follows only the assembly 40 will be described in detail, and it will be understood that the assembly 40a is a mirror image thereof with corresponding parts receiving corresponding reference numerals with the addition of subscript "a." The assembly 40 includes a hook member 41, which may be integral with the draft link 17, terminating in a hook 42 providing a seat 43. Pivoted with respect to the hook member is a vertically oriented keeper member 45. Pivoting takes place about a transverse bolt 46, having a nut 47, at the forward end of the keeper, which bolt may be also utilized, as shown, to mount the members 36, 37 of the A-frame.

Figure 2:
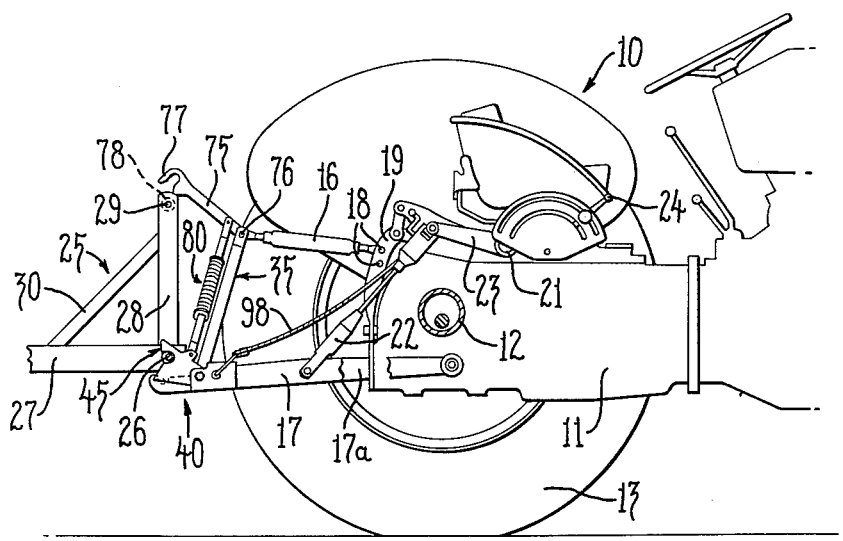
FIG. 2 is similar to FIG. 1 with the tractor and implement brought into engagement.
Figure 4:
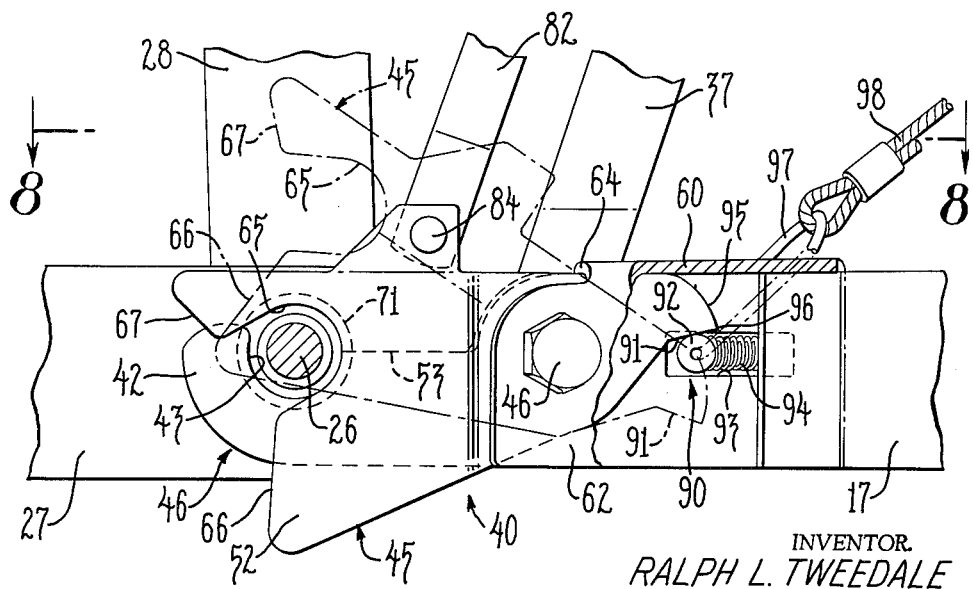
FIG. 4 is an enlarged fragmentary elevation of the lower link coupling shown in FIG. 3 with portions broken away to show certain details and with dash lines indicating the alternate position of the keeper mechanism.
Figure 5:
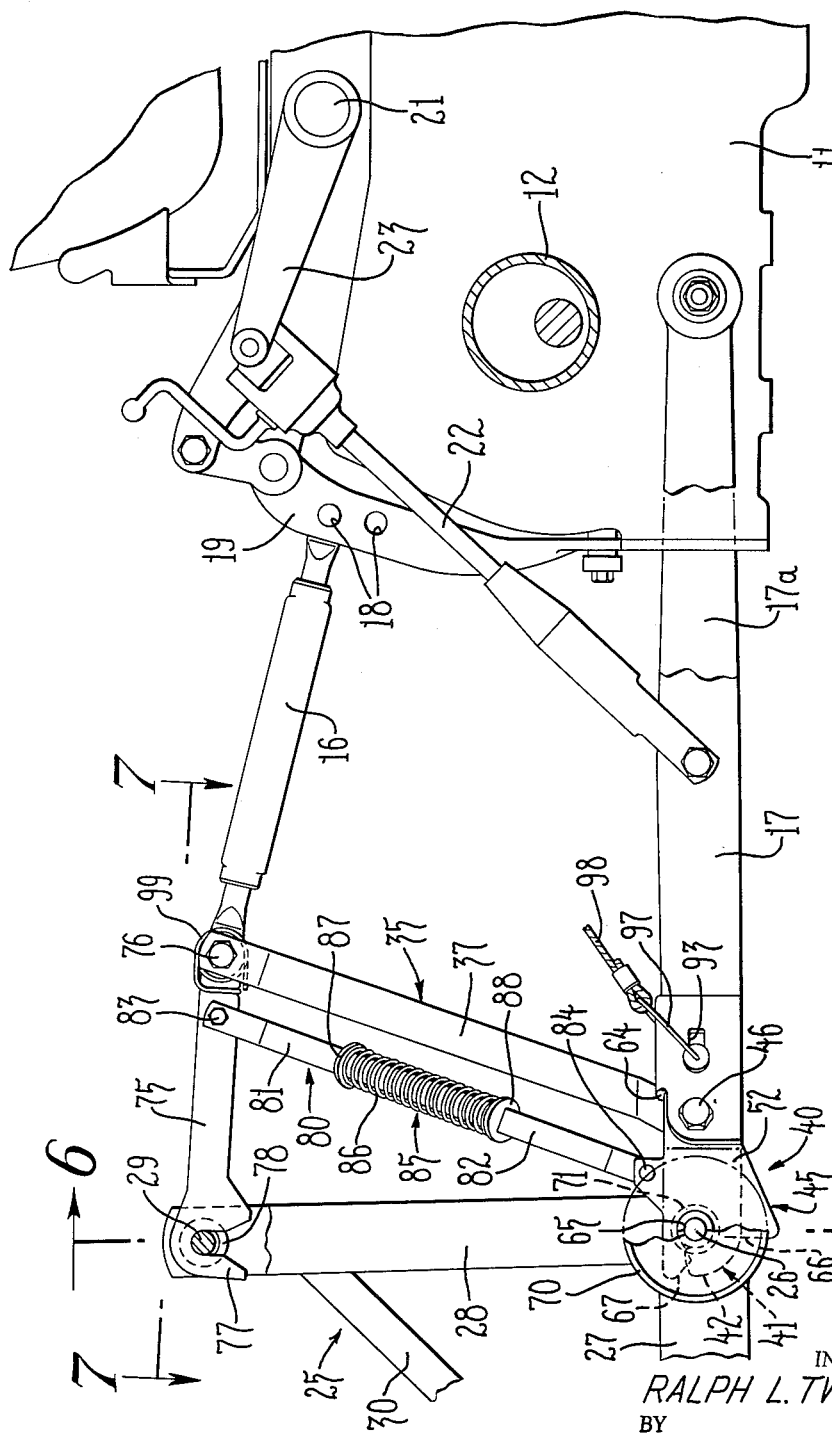
FIG. 5 is an enlarged fragmentary side view similar to FIG. 3 with portions of the external connecting elements broken away.

To permit the keeper member 45 to lie on both sides of, and symmetrically straddle, the hook member 41, it is preferably formed with two walls 51, 52 which have identical contour with a spacer 53 being interposed between them along the upper edge (see FIGS. 4 and 8). Fitted over the keeper and hook member is a saddle 60 having side walls 61, 62 through which the bolt 46 extends, but with internal clearance being provided at 63 to insure freedom of movement of the keeper. The front edge of the saddle is cut out as indicated at 64 to permit, yet limit, the upward rocking movement of the keeper so that, when upraised, the keeper is positioned as shown in FIGS 1 and 2 and as indicated by the dot-dash outline in FIG. 4.

For the purpose of receiving the lower draft pins of the implement when the tractor is backed toward the implement, the two side members forming the keeper 45 are formed with a pin receiving throat 65. To facilitate entry of the draft pin into the root of the throat, guide surfaces indicated at 66, 67 are provided on the opposite sides of the throat. These surfaces, as shown, are funneled inwardly to insure that the draft pin on the implement will be positively guided into the throat even though the throat and draft pin may not be at precisely the same elevation. This provides automatic vertical centering. In addition, to provide lateral centering between the keeper and the draft pin on the implement, a convexly shaped guide member 70 is telescoped over the draft pin 26 of the implement and the pin is provided with a truncated ball 71 interposed between the guide member 70 and the implement frame. The ball 71 provides a ball-and-socket action with respect to the hook member and the keeper, both of which are preferably hemispherically recessed. The draft pin assembly is held together by a linchpin 72 which is fitted into an opening at the end of the pin. Any standard draft pin may be converted to the above form.

Thus it will be apparent that as the tractor backs toward the implement, the keeper 45, which is in open position ready to receive the draft pin is cammed both vertically and horizontally until the draft pin is fully seated in the keeper throat.

In carrying out the present invention a top engaging member, or mast coupling, is provided pivoted to the rear end of the top link 16 and having a hook at the rear end thereof which hooks over the mast pin 29 on the implement upon lowering of the keeper member into closed position. In the present instance the upper hook member indicated at 75 is pivoted at its forward end to the top link 16 by means of a pivot bolt 76. The forward end of the member 75 is preferably bifurcated as shown (FIG. 7) so that the hook member is perfectly centered with respect to the top link. At its opposite or rear end the member 75 is formed into a hook 77. To provide limited ball-and-socket action at the point of connection of the hook and the mast pin 29 on the implement, the pin preferably carries a truncated ball 78, with the interior of the hook being complementarily formed to provide a snug fit. For the purpose of tying together the keeper member 45 and the top hook member 75 for movement in unison, a vertical link or tie rod 80 is provided which is made up of two portions 81, 82 secured at the upper end by a bolt 83 and at the lower by a bolt 84. The two portions of the link are connected together by a prestressed resilient connection 85 including a spring 86 seated on stops 87, 88 which establish a nominal length for the link 80 but which permit resilient elongation. This insures snug seating of the upper hook member in spite of variations in the vertical spacing between the draft pins and mast pin of the various implements with which the present quick hitch may be employed.

In the further carrying out of the present invention a latch is provided for each of the keepers 45, 45a so that when the keepers are swung downwardly from the open position shown by the dot-dash outline in FIG. 4 to the lowered or locking position, the keepers, and the upper hook member as well, are latched in locking position until intentionally released by the tractor operator. In the present instance such latching is taken care of by a latch mechanism 90 at the forward end of the keeper 45. This latching mechanism includes a latching surface 91 which cooperates with a latch pin 92 extending transversely in a slot 93 formed in the rear end of the draft link 17, and in registering slots formed in the side walls 61, 62 of the saddle. The latch pin is pressed into latching position by a coil spring 94. A rounded cam surface 95 on the keeper leads up to a point of drop-off 96. It will be apparent, then, that when the keeper member 45 is rocked downwardly, the latch pin 92 follows the cam surface 95 until the point of drop-off 96 is reached, following which the spring 94 urges the pin 92 into latching position. The latch surface 91 is preferably formed at at a shallow angle as shown so that the pin, under the urging of the spring, tends to wedge against the keeper locking it tightly in place.

For the purpose of releasing the latch manually without necessity for the operator's leaving his seat, the latch pin is preferably provided with a bail 97 which is connected to a cable 98 which is anchored at its forward end at a position adjacent the tractor seat; thus by pulling on the cable the latch pin is withdrawn from latching position. Moreover, for the purpose of urging the keepers and the top hook member upwardly into the upraised, or ready, position when the latch pin is released, a torsion spring 99 (see especially FIG. 7) surrounds the bolt 76 and engages the hook member 75 to apply torsion in the clockwise direction.

Figure 3:
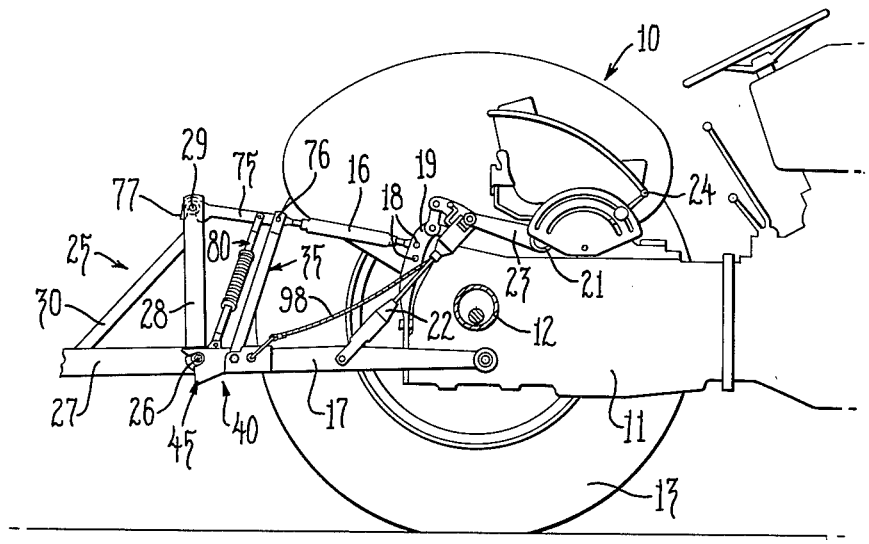
FIG. 3 is similar to FIG. 2 with the coupling completed.

It will be apparent to one skilled in the art with the above construction in mind that hitching may be accomplished simply by backing the tractor into engagement with the implement followed by raising of the draft links. Conversely, release may be effected by lowering the draft links and by driving the tractor away from the implement. Considering first the problem of hitching the implement, backing the tractor causes the draft pin 26 on the implement to strike either of the funneling surfaces 66 or 67 on the keeper 45 depending upon whether the pin on the implement is low or high. Lateral guiding of the keeper is taken care of by the convex guiding member 70. Once contact takes place at the funneling surfaces, further backing causes the draft pin to be guided down into the root of the throat 65. Because of the crowding or wedging action, vertical accommodation takes place either by slight movement of the implement or by slight movement of the tractor draft links. In any event with the implement draft pins fully seated, the upper hook member is poised over the mast pin as shown in FIG. 2. Subsequently, slight movement of the quadrant lever 24 actuating the power lift mechanism on the tractor causes the tractor draft links 17, 17a to move upwardly. Because of the weight of the implement the draft pins tend to remain stationary with respect to the ground producing counterclockwise rocking of the keepers 45, 45a thus transporting the implement draft pins relatively downward into seated position on the hooks 42, 42a at the ends of the draft links. During the course of this movement, because of the downward force applied by the tie rods 80, 80a, the upper hook member 75 is swung downwardly so that the hook 77 thereon engages the pin 29 at the top of the mast of the implement as shown in FIG. 3. The tie rods 80, 80a may be made slightly "short" to insure firm seating at the top pin and with resilient accommodation of any slight overtravel.

Also during the course of such movement, the latch pin 92 rides along the cam surface 95 until, at the end of the movement of the keepers, drop-off is reached with the latch pin snapping into place against the latch surface 91. Because of the fact that the upper edge portion of the keeper overhangs as shown in FIG. 3, slightly overlapping the tip of the hook 42, it will be apparent that the draft pin 26 on the implement is securely captive. Moreover, the root of the throat 65 in the keeper is formed at such a radius relative to the pivot bolt 46 that the pin is registered and seated in the hook without play in the fore-and-aft direction and with the draft force being almost totally borne by the hook. It is apparent therefore that secure hitch-up occurs more or less automatically without any special skill or attention on the part of the operator. The hitch arrangement, because of the "guiding" features discussed above, makes it easy for the tractor operator to secure alinement and full seating. The keepers, in the act of straightening, serve as toggles having a high mechanical advantage, insuring seating of the pins at the engagement surfaces without necessity for any jockeying of the tractor and in spite of minor differences which may exist in the lateral and vertical spacing of the draft and mast pins on the implement.

It is to be particularly noted that the above quick-hitch construction, while permitting easy attachment, does not in any way change the geometry of the regular three-point hitch and thus there is no change in the mode of operation or any reduction in the efficiency of the implement by reason of the added hitch elements. Nor is there any reduction in, or limitation upon, the freedom and flexibility which normally exists between the hitch and the implement since the ball and socket connections permit limited relative movement in both the horizontal and vertical planes which is desirable where the implement must follow ground contours.

When the work has been completed, the quadrant lever is moved slightly in a direction to lower the draft links and tension is manually applied to the release cord 98, without necessity for dismounting. After the implement strikes the ground, the continued lowering of the draft links 17, 17a causes the keepers to rotate clockwise, and the top hook member to rotate clockwise, until they are in the same position as shown in FIG. 2. Such clockwise rotation is facilitated by the torsion provided by the spring 99 at the point of connection of the upper hook member 75. With the implement draft pins thus removed from the hook members at the ends of the draft links, the tractor operator may simply engage his clutch and drive away, leaving the implement parked on the ground.

Once the tractor is equipped with the present hitch mechanism, and once the implement draft pins are provided with the disclosed truncated balls and convex guiding elements (FIG. 6), it will be apparent that the tractor may be used universally, and without further change, for all of the various implements. Since only a small amount of added mechanism is required and since only minor addition need be made to the various implements, it will be apparent that converting to the present "quick hitch" is something which can be done at minor expense by the farmer himself. Although the added mechanism is of inherently light construction, it is nevertheless inherently strong and durable permitting the tractor to be employed for even the heaviest jobs.

I claim as my invention:

1. A quick-hitch mechanism for use with a tractor having a pair of laterally spaced power elevated draft links trailingly pivoted thereon and a top link centered above them for connection to three correspondingly located lateral hitch pins on an implement, comprising in combination, a pair of hook members at the rear ends of the draft links and having upwardly facing hooks formed thereon, keeper members in the form of vertically arranged plates of metal pivoted at their forward ends to the hook members respectively and having a funnel shaped throat along the rear edges thereof defining a pair of guiding edges leading to a central root so that when the tractor is backed into engagement with the implement the lateral hitch pins on the implement are engaged by the guiding edges and guided into the root notwithstanding slight vertical misalignment between the tractor and implement, the root of the keeper members being at such radius as to register with hooks so that when the draft links are subsequently power elevated the resulting relative swing of the keeper members downwardly into a closed position causes the implement pins to be transported into seated position in the respective hooks, and means for latching the keeper members in closed position.

2. A quick hitch mechanism for use with a tractor having a pair of laterally spaced power elevated draft links trailingly pivoted thereon and a top link centered above them spaced to correspond to the draft and mast pins on an implement comprising, in combination, an A frame connecting the rear ends of the links together to maintain predetermined spacing between them, pivoted pin-engaging members pivoted for swinging movement at the rear ends of the draft links and top lik respectively for fore-and-aft rocking movement about transverse axes between an open pin-receptive position and a closed, hooking position in which the pin on the implement are captive, a vertical link for coupling together the pin engaging members for movement in unison with power elevated movement of the draft links, means for latching the engaging members in hook position, and means accessible by the operator from the tractor seat for releasing the latching means.

3. A quick-hitch mechanism for use with a tractor having a pair of laterally spaced power elevated draft links trailingly pivoted thereon and a top link centered above them for connection to three correspondingly located lateral hitch pins on an implement, comprising in combination, a pair of hook members at the rear ends of the draft links and having upwardly facing hooks formed thereon, keeper members in the form of vertically arranged plates of metal pivoted at their forward ends to the hook members respectively and having a funnel shaped throat along the rear edges thereof leading to a central root so that when the tractor is backed into engagement with the implement the lateral hitch pins on the implement are engaged and guided into the root notwithstanding slight vertical misalinement between the tractor and implement, the root of the keeper members being at such radius as to register with the hooks so that when the draft links are subsequently power elevated the resulting relative swing of the keeper members downwardly into a closed position causes the implement pins to be transported into seated position in the respective hooks, and means for latching the keeper members in closed position, the pivots of the keeper members being horizontally alined with their respective hooks when the links are in horizontal draft position.

4. A quick-hitch mechanism for use with a tractor having a pair of laterally spaced power elevated draft links trailingly pivoted thereon and a top link centered above them spaced to correspond to the draft and mast pins on an implement comprising, in combination, an A frame connecting the rear ends of the links together to maintain predetermined spacing between them, pivoted pin-engaging members pivoted for swinging movement at the rear ends of the draft links and top link respectively for fore-and-aft rocking movement about transverse axes between an open, pin-receptive position and a closed, hooking position in which the pins on the implement are held captive, linkage including a resilient element for coupling together the pin engaging members so that they move in unison into hooking position upon power elevated movement of the draft links for seating of all the pins notwithstanding minor variation of spacing of the pins on the implement, means for latching the engaging members in hooking position, and means accessible by the operator from the tractor seat for releasing the latching means.

References Cited by the Examiner

UNITED STATES PATENTS

| | | | |
|---|---|---|---|
| 2,674,169 | 4/1954 | Sawyer | 280—477 |
| 2,681,813 | 6/1954 | Seeburger | 280—456 |
| 2,691,932 | 10/1954 | Sawyer | 172—272 |
| 2,711,679 | 6/1955 | Kuhary et al. | 280—477 X |
| 2,869,654 | 1/1959 | Hershman | 280—479 X |
| 2,979,137 | 4/1961 | Hess | 280—510 |
| 3,034,587 | 5/1962 | Dorkins et al. | 280—479 X |

BENJAMIN HERSH, *Primary Examiner.*

A. HARRY LEVY, *Examiner.*